(12) United States Patent
Moore

(10) Patent No.: US 8,839,897 B2
(45) Date of Patent: Sep. 23, 2014

(54) HYBRID HYDRAULIC VEHICLE DRIVE SYSTEM

(71) Applicant: Robert Bosch GmbH, Stuttgart (DE)

(72) Inventor: Charles Moore, Broadview, IL (US)

(73) Assignee: Robert Bosch GmbH, Stuttgart (DE)

( * ) Notice: Subject to any disclaimer, the term of this patent is extended or adjusted under 35 U.S.C. 154(b) by 21 days.

(21) Appl. No.: 13/670,625

(22) Filed: Nov. 7, 2012

(65) Prior Publication Data

US 2014/0124281 A1    May 8, 2014

(51) Int. Cl.
*B60K 6/12* (2006.01)
*G06F 11/30* (2006.01)

(52) U.S. Cl.
CPC .. *B60K 6/12* (2013.01); *G06F 11/30* (2013.01)
USPC ........................................... 180/165; 180/305

(58) Field of Classification Search
USPC .................................. 180/165, 305, 307, 308
See application file for complete search history.

(56) References Cited

U.S. PATENT DOCUMENTS

| | | | |
|---|---|---|---|
| 5,505,527 A * | 4/1996 | Gray et al. | 303/3 |
| 7,100,723 B2 | 9/2006 | Roethler et al. | |
| 7,147,239 B2 | 12/2006 | Teslak et al. | |
| 8,118,132 B2 * | 2/2012 | Gray, Jr. | 180/305 |
| 2008/0093152 A1 | 4/2008 | Gray | |

FOREIGN PATENT DOCUMENTS

| | | |
|---|---|---|
| JP | 2006151306 | 6/2006 |
| JP | 2007203830 | 8/2007 |

OTHER PUBLICATIONS

Plymell, K. et al., "Hydraulic Hybrid Vehicles: Reducing Heavy Diesel Vehicle Emissions at an Affordable Price," Colorado State University Department of Electrical and Computer Engineering, 2009, 31 pages.

* cited by examiner

*Primary Examiner* — John Walters
(74) *Attorney, Agent, or Firm* — Michael Best & Friedrich LLP

(57) ABSTRACT

A drive system for a hybrid hydraulic vehicle. The drive system includes an engine, a hydraulic pump driven by the engine, a converter coupled to the pump, a drive train coupled to the converter a first hydraulic pathway coupling the hydraulic pump to the converter, a second hydraulic pathway coupling the hydraulic pump to the converter, a reservoir positioned in the second hydraulic pathway, an accumulator positioned in the first hydraulic pathway, a pressure sensor configured to sense the pressure of hydraulic fluid in the accumulator, and a controller. The controller is configured to receive an indication of the pressure of the hydraulic fluid in the accumulator from the pressure sensor, and to adjust a low pressure level threshold of the pressure of hydraulic fluid in the accumulator based on the operation of the vehicle such that the pressure of the hydraulic fluid in the accumulator reaches a predetermined target pressure when the vehicle brakes.

17 Claims, 5 Drawing Sheets

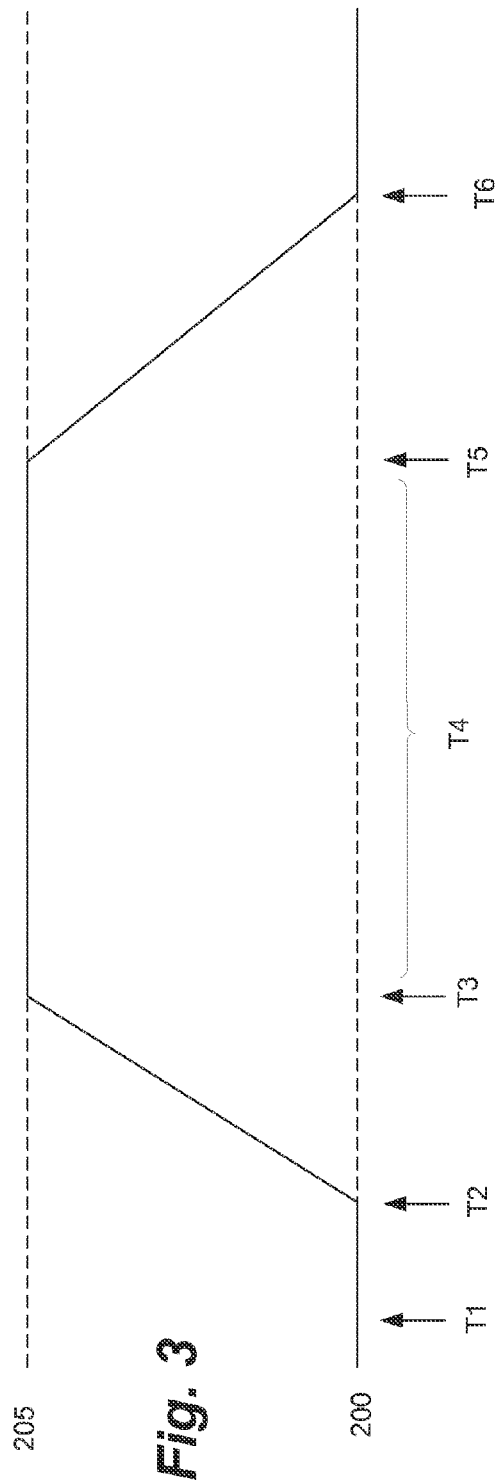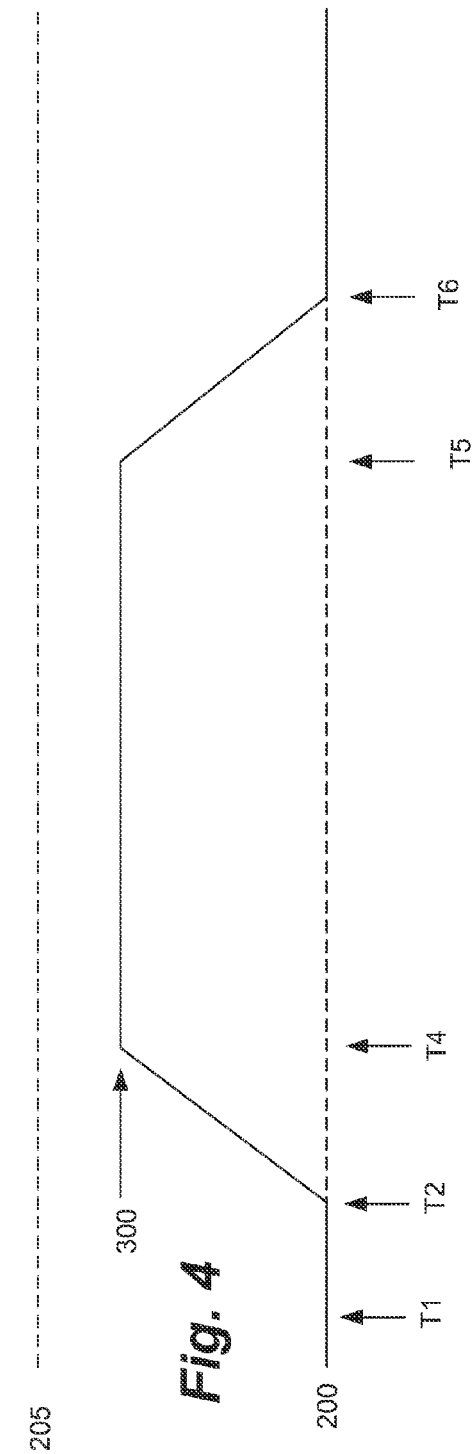

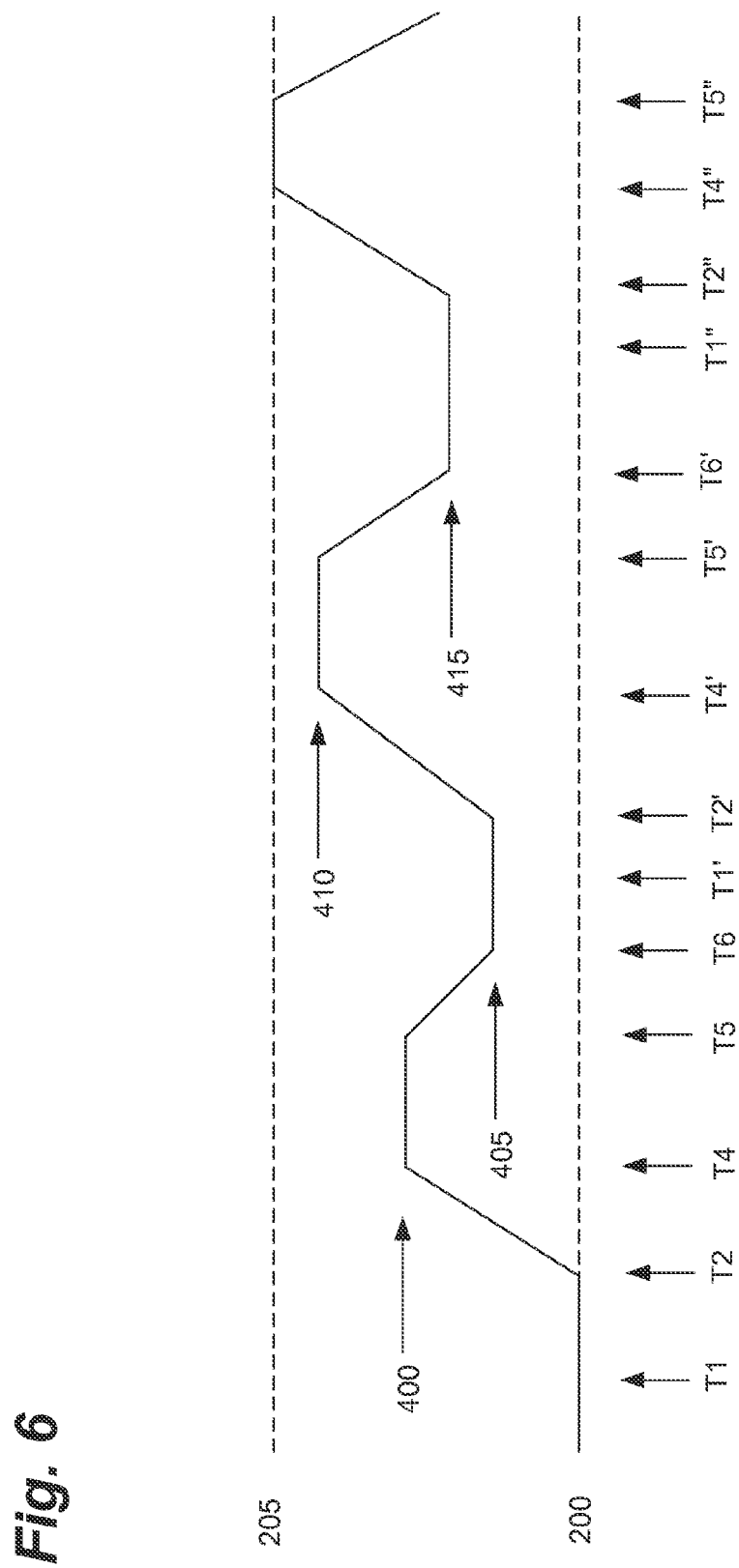

HYBRID HYDRAULIC VEHICLE DRIVE SYSTEM

BACKGROUND

The present invention relates to hydraulic hybrid vehicles, specifically a system and method for increasing the efficiency of a hydraulic hybrid vehicle.

Generally, hydraulic hybrid vehicles store energy, in the form of hydraulic pressure, during braking of the vehicle. The vehicle then uses the stored energy to assist in propelling the vehicle.

SUMMARY

When a vehicle is operated with short, regular or repeating stops and starts, it is difficult to utilize energy that may be stored in a storage system. A so-called "collection mode" is sometimes used to recognize when a vehicle is being operated in a fashion where there are repeated or frequent stops and starts (decelerating and accelerating). Current control strategies (typically implemented in software) use a fixed value for the lower operating pressure limit for the hydraulic storage system. Embodiments of the invention, utilized control strategies or techniques where the lower operating pressure limit can be varied.

In one embodiment, the invention provides a drive system for a hybrid hydraulic vehicle. The drive system includes an engine, a hydraulic pump driven by the engine, a converter coupled to the pump, a drive train coupled to the converter a first hydraulic pathway coupling the hydraulic pump to the converter, a second hydraulic pathway coupling the hydraulic pump to the converter, a reservoir positioned in the second hydraulic pathway, an accumulator positioned in the first hydraulic pathway, a pressure sensor configured to sense the pressure of hydraulic fluid in the accumulator, and a controller. The controller is configured to receive an indication of the pressure of the hydraulic fluid in the accumulator from the pressure sensor, and to adjust a low pressure level threshold of the pressure of hydraulic fluid in the accumulator based on the operation of the vehicle such that the pressure of the hydraulic fluid in the accumulator reaches a predetermined target pressure when the vehicle brakes.

In another embodiment the invention provides a method of operating a hydraulic hybrid vehicle. The method includes monitoring a hydraulic pressure in an accumulator of a hybrid hydraulic drive system of a vehicle during braking of the vehicle, comparing the monitored pressure to a predetermined target pressure, and raising a low pressure level threshold when the vehicle comes to a stop and the monitored pressure is less than the predetermined target pressure Other aspects of the invention will become apparent by consideration of the detailed description and accompanying drawings.

BRIEF DESCRIPTION OF THE DRAWINGS

FIG. 3 is a graph showing the pressure in an accumulator of the hydraulic hybrid vehicle drive system during normal operation.

FIG. 4 is a graph showing the pressure in the accumulator of the hydraulic hybrid vehicle drive system during a start/stop operation where the braking time of the vehicle is too short to bring the pressure in the accumulator up to a target.

FIG. 6 is a graph showing the pressure in the accumulator of the hydraulic hybrid vehicle drive system during start/stop operations implementing the operation shown in FIG. 5.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
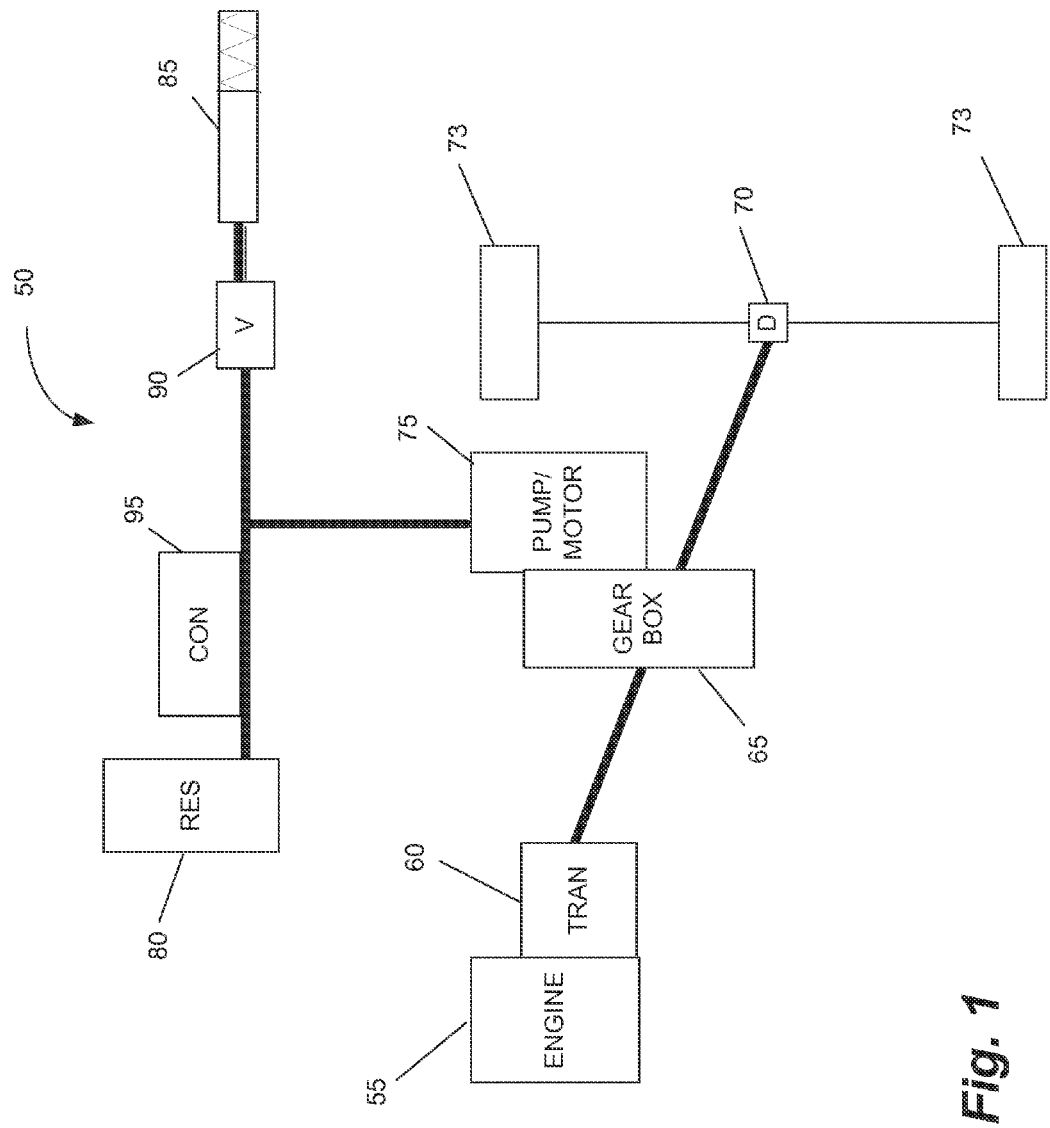
FIG. 1 is a block diagram of an embodiment of a hydraulic hybrid vehicle drive system.

FIG. 1 shows a construction of a hydraulic hybrid vehicle drive system 50 of a hydraulic hybrid vehicle. The system 50 includes an engine 55 driving a transmission 60 which is coupled to a gearbox 65, including a clutch. The gearbox 65 drives a differential 70 which in turn drives one or more wheels 73 of the vehicle.

The gearbox 65 is also coupled to a hydraulic system including a hydraulic pump/motor 75 which in turn is hydraulically coupled to a hydraulic fluid reservoir 80 and an accumulator 85 (via a valve 90). A controller 95 controls the operation of the hydraulic system. During braking of the vehicle, the gearbox 65 operates the pump/motor 75 to pump hydraulic fluid into the accumulator 85. The valve 90 closes when the pressure of the hydraulic fluid in the accumulator 85 exceeds a maximum pressure, and the hydraulic fluid flows into the reservoir 80. The pressurized hydraulic fluid in the accumulator 85 is provided to the pump/motor 75 when the vehicle accelerates once again, assisting the engine 55 and transmission 60 (via the gearbox 65) in propelling the vehicle until the charge in the accumulator 85 is depleted. This assistance allows the engine 55 to operate at a lower level saving energy (e.g., fuel).

Figure 2:
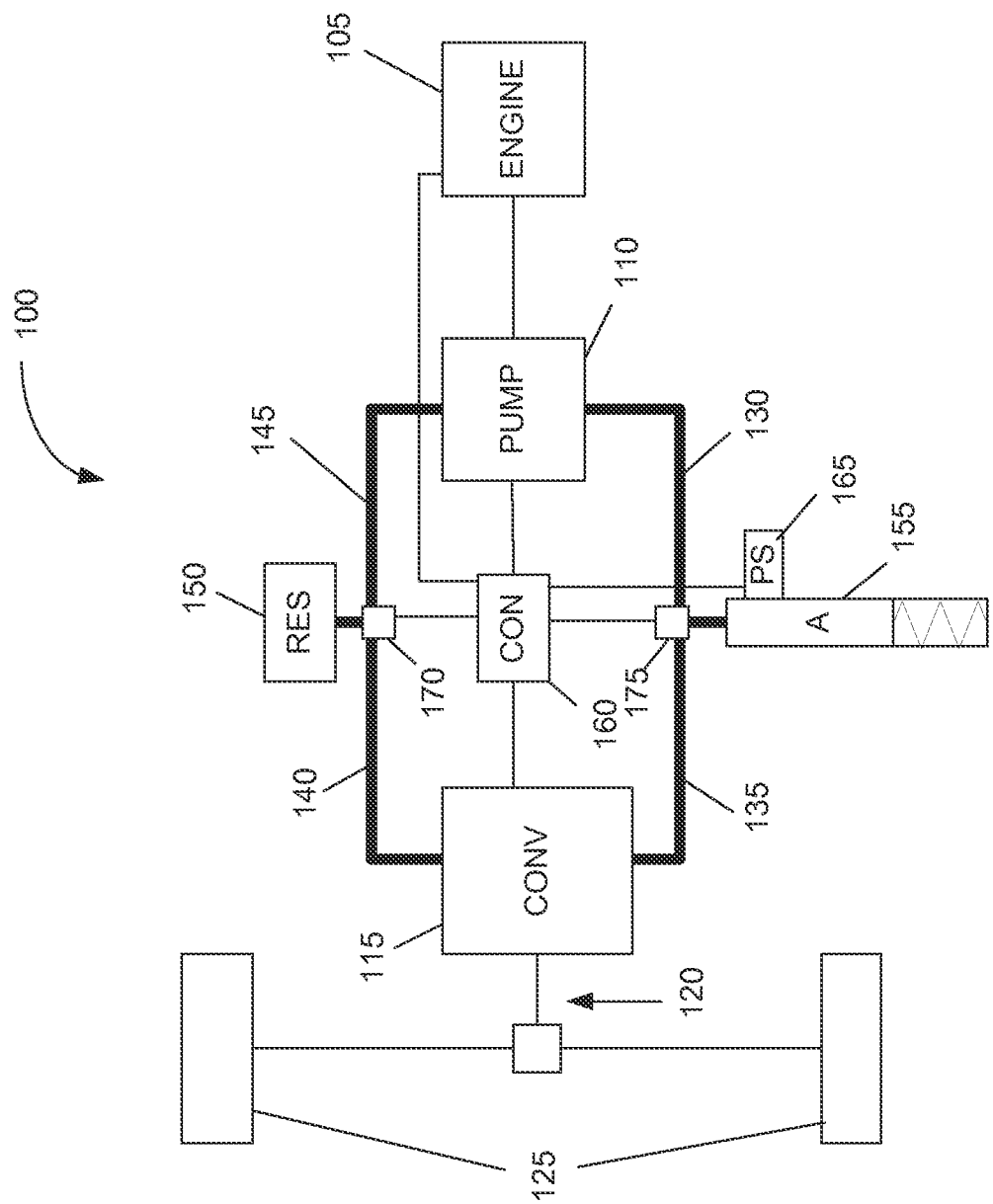
FIG. 2 is a block diagram of an alternative embodiment of a hydraulic hybrid vehicle drive system.

FIG. 2 shows an alternative construction of a hydraulic hybrid vehicle drive system 100 of a hydraulic hybrid vehicle. The system 100 includes an engine 105 driving a hydraulic pump 110. During propulsion of the vehicle, the pump 110 pumps hydraulic fluid through the system 100 to a hydraulic motor or converter 115. The converter 115 converts the pressure of the hydraulic fluid into a rotation force on a drive train 120 which drive one or more wheels 125 of the vehicle. The hydraulic fluid flows through a series of pipes 130, 135, 140, and 145 to the converter 115 and then to a reservoir 150 and back to the pump 110. The pipes 130 and 135 form a first hydraulic pathway (e.g., a high-pressure side), and pipes 140 and 145 form a second hydraulic pathway (e.g., a low-pressure side). Depending on the speed of the pump 110 (e.g., the desired acceleration or speed of the vehicle), all, some, or none of the hydraulic fluid collects in the reservoir 150. The fluid that is not collected in the reservoir 150 travels directly back to the pump 110. If the pump 110 is accelerating, additional hydraulic fluid is drawn from the reservoir 150.

In addition, the system 100 includes an accumulator 155. The accumulator 155 stores hydraulic fluid under pressure. During propulsion of the vehicle, the stored pressure is used to supplement the pressure produced by the pump 110 to propel the vehicle, and reduce the fuel needed to operate the engine 105. The accumulator 155 is charged during braking of the vehicle. During braking, the converter 115 is driven by the wheels 125 and the drive shaft 120, sending hydraulic fluid to the accumulator 155. In some embodiments, the pump 110 is stopped and blocks the flow of hydraulic fluid forcing the fluid into the accumulator 155 until the pressure in the accumulator 155 reaches a predetermined limit, at which time any additional hydraulic fluid is diverted to the reservoir 150. In an alternative embodiment, the pump 110 operates continuously and includes a plurality of vanes which swivel. The controller 160 controls the angle of the vanes to direct the hydraulic fluid toward the first hydraulic pathway or the second hydraulic pathway. The accumulator 155 also includes a pressure relief valve (not shown). The pressure relief valve releases hydraulic fluid to the reservoir 150 when the pressure in the accumulator 155 exceeds a maximum predetermined limit.

The system 100 also includes a controller 160, a pressure sensor 165, and valves 170 and 175. The controller 160 receives signals from the pressure sensor 165 indicative of the pressure of hydraulic fluid in the accumulator 155. The controller 160 controls the operation of the components of the system 100 (e.g., the engine 105, the hydraulic pump 110, the converter 115, and the valves 170 and 175.

The controller 115 includes a processor (e.g., a microprocessor, microcontroller, ASIC, DSP, etc.), computer readable media or memory (e.g., flash, ROM, RAM, EEPROM, etc.), which can be internal to the processor, external to the processor, or a combination thereof, and input/output circuitry.

FIG. 3 shows a graph of the pressure of the hydraulic fluid in the accumulator 155. During propulsion of the vehicle, at time T1, the pressure is at a predetermined minimum level 200. The predetermined minimum level 200 is the level at which the propulsion charge of the accumulator is depleted (i.e., there is no more capacity to provide propulsion force). When the vehicle is braking (starting at time T2), the pressure increases to a maximum level 205 (at time T3). The vehicle comes to a complete stop at time T4 or any time prior to time T5. When the vehicle starts moving again (time T5), the pressure of the hydraulic fluid in the accumulator 155 is used to assist in propelling the vehicle until the pressure has returned the predetermined minimum level 200 (time T6). Provided the vehicle is traveling fast enough and the braking lasts long enough, the amount of pressure produced in the accumulator 155 reaches the maximum level 205. However, during start/stop operation of the vehicle, the speed of the vehicle may be too slow and the braking time may be too short to allow pressure in the accumulator 155 to build to the maximum level 205.

FIG. 4 shows a graph of the pressure of the hydraulic fluid in the accumulator 155 during such start/stop operation. During propulsion of the vehicle at time T1, the pressure is limited to the predetermined minimum level 200. When the vehicle is braking (starting at time T2), the pressure increases. When the vehicle comes to a stop (time T4), the pressure is at a level 300 which is less than the maximum level 205 because the vehicle was not traveling fast enough or the braking time was not long enough to build the pressure in the accumulator 155 to the maximum level 205 (thus time T3 was never reached). When the vehicle starts moving again (time T5), the pressure of the hydraulic fluid in the accumulator 155 is used to assist in propelling the vehicle until the pressure decreases to the predetermined minimum level 200 (time T6).

Because the accumulator 155 is assisting in propelling the vehicle for a shorter time period (the time from T5 to T6) than in FIG. 3 when the maximum level 205 is achieved, the accumulator 155 is providing less assistance to the engine 105 in propelling the vehicle. In addition, because the energy stored at the maximum level 205 is greater than the energy stored at lesser pressure levels, the amount of energy provided to assist in the propulsion of the vehicle is also less than if it were provided for a similar period of time but at a greater pressure.

The invention increases the fuel efficiency of the vehicle by increasing the working pressure range of the hydraulic fluid stored in the accumulator 155 (i.e., increases the energy stored) during start/stop operation.

Figure 5:
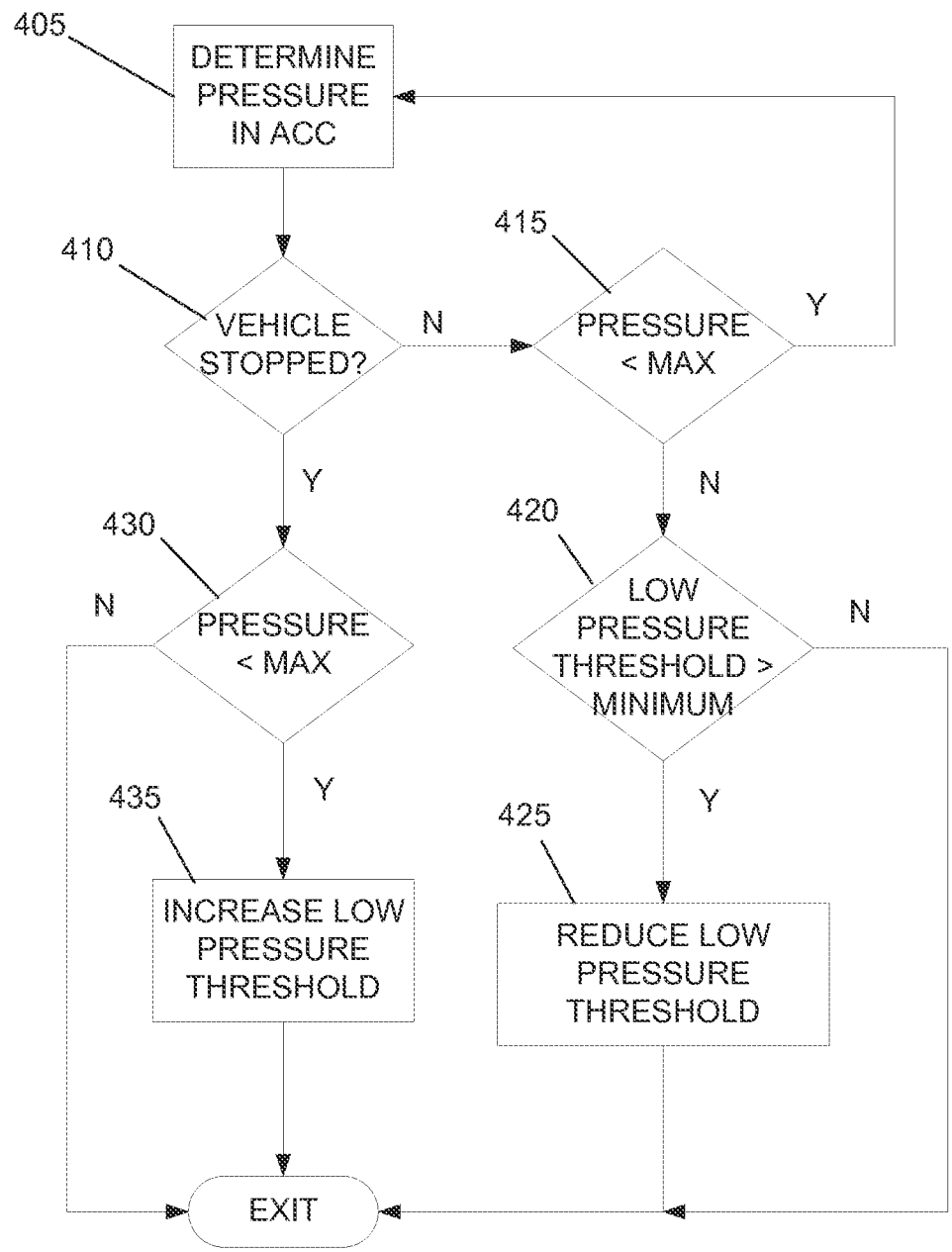
FIG. 5 is a flow chart of an embodiment of the operation of the drive system.

FIG. 5 shows a method of operating a hydraulic hybrid vehicle drive system 100 to improve the efficiency of the hybrid vehicle. When the vehicle begins to brake, the controller 160 determines the pressure of the hydraulic fluid in the accumulator 155 (step 405) by reading the output of the pressure sensor 165. Next, the controller 160 determines if the vehicle is stopped (step 410). If the vehicle is not stopped (i.e., is braking but still moving), the controller 160 compares the pressure in the accumulator 155 to the maximum level 205 (step 415). If the pressure in the accumulator 155 is less than the target, the controller 160 loops back to read the pressure again (step 405). If the pressure is greater than or equal to the target pressure (generally, the pressure should not exceed the target pressure as the speed with which the pressure is checked is extremely fast), the controller 160 determines if a low pressure threshold is greater than the predetermined minimum low pressure (step 420). If the low pressure threshold is equal to the predetermined minimum low pressure, the controller 160 exits the operation.

If the low pressure threshold is greater than the predetermined minimum low pressure, the controller 160 adjusts the low pressure threshold lower (step 425) and exits. The controller 160 adjusts the low pressure threshold to increase the amount of energy provided by the accumulator 155 when the vehicle starts moving. Because the target pressure was exceeded, the vehicle is braking for a longer period than it previously was, so the controller 160 attempts to maximize the amount of energy stored in the accumulator 155. The controller 160 can use a plurality of different methods to adjust the low pressure threshold. For example, the controller 160 can determine the speed of the vehicle at the time the target pressure was reached, and adjust the low pressure threshold by a magnitude reflecting the speed (e.g., adjust the low pressure threshold a small amount if the speed of the vehicle was relatively slow and adjust the low pressure threshold a larger amount if the vehicle was still moving at a relatively significant speed). The controller 160 can also adjust the low pressure threshold by a predetermined magnitude (e.g., step the low pressure threshold down). In another embodiment, the controller 160 can adjust the low pressure threshold down by the same magnitude as the low pressure threshold was previously raised. Other embodiments can employ different schemes for determining the magnitude of the adjustment of the low pressure threshold.

If the vehicle was stopped (step 410), the controller 160 determines if the pressure in the accumulator 155 is less than the target pressure (step 430). If not (i.e., the pressure is at the target level), the controller 160 exits the operation. However, if the pressure is less than the target, the controller 160 adjusts the low pressure threshold higher (step 435) in an attempt to have the pressure in the accumulator 155 reach the target pressure during the next stop cycle. Similar to the reduction of the low pressure threshold in step 425 above, the controller 160 can use a plurality of different methods to determine the magnitude of the adjustment to the low pressure threshold. For example, the controller 160 can use a PID controller to determine the magnitude, the controller 160 can adjust the low pressure threshold an amount based on the difference between the pressure obtained and the target pressure (e.g., 50% of the difference), the controller 160 can maintain a moving average of the pressures attained over a series of stop cycles and adjust the low pressure threshold based on the moving average, the controller 160 can increment the low pressure threshold a set amount each time the pressure obtained is less than the target pressure, or the controller 160 can use another suitable method to determine the magnitude to adjust the low pressure threshold. In addition, the magnitude of the adjustment can be determined using a plurality of methods.

FIG. 6 shows an example of a graph of the pressure of the hydraulic fluid in the accumulator 155 during start/stop operations implementing an embodiment of the invention. During propulsion of the vehicle at time T1, the pressure is kept at the predetermined minimum level 200. When the vehicle is braking (starting at time T2), the pressure increases. When the vehicle comes to a stop (time T4), the pressure is at a level 400 which is less than the maximum level 205, because the vehicle was not traveling fast enough or the braking time was not long enough to build the pressure in the accumulator 155 to the maximum level 205 (thus time T3 was never reached). Therefore, the controller 160 adjusts the low level pressure threshold to a level 405 greater than the minimum level 200.

When the vehicle starts moving again (time T5), the pressure of the hydraulic fluid in the accumulator 155 is used to assist in propelling the vehicle until the pressure has reached the adjusted low pressure threshold 405 (time T6).

During the next propulsion of the vehicle at time T1', the pressure is kept at the low pressure threshold 405. When the vehicle begins braking again (starting at time T2'), the pressure increases. When the vehicle comes to a second stop (time T4'), the pressure is still at a level 410 which is less than the maximum level 205. Therefore, the controller 160 again adjusts the low level pressure threshold to a new level 415 greater than the previous low pressure threshold 405.

When the vehicle starts moving again (time T5'), the pressure of the hydraulic fluid in the accumulator 155 is used to assist in propelling the vehicle until the pressure has reached the readjusted low pressure threshold 415 (time T6').

During the next cycle (T1", T2", T4", and T5"), in the example shown, the pressure in the accumulator 155 reaches the target pressure, and the low pressure threshold 415 is not adjusted further.

Various features and advantages of the invention are set forth in the following claims.

What is claimed is:

1. A drive system for a hybrid hydraulic vehicle, the drive system comprising:
   an engine;
   a hydraulic pump driven by the engine;
   a reservoir coupled to the hydraulic pump;
   an accumulator coupled to the hydraulic pump;
   a pressure sensor configured to sense the pressure of hydraulic fluid in the accumulator; and
   a controller configured to receive an indication of the pressure of the hydraulic fluid in the accumulator from the pressure sensor, and to adjust a low pressure level threshold of the pressure of hydraulic fluid in the accumulator based on the operation of the vehicle such that the pressure of the hydraulic fluid in the accumulator reaches a predetermined target pressure when the vehicle brakes.

2. The system of claim 1, wherein the low pressure level threshold is raised when the vehicle comes to a stop and the pressure of the hydraulic fluid in the accumulator is less than the predetermined target pressure.

3. The system of claim 2, wherein a magnitude of the adjustment of the low pressure level threshold is set at a percentage of the difference between the pressure reached in the accumulator and the predetermined target pressure.

4. The system of claim 2, wherein the low pressure level threshold is adjusted by a fixed magnitude.

5. The system of claim 1, further comprising a PID controller, the PID controller determining a magnitude of the adjustment of the low pressure level threshold.

6. The system of claim 1, wherein the low pressure level threshold is lowered when the pressure of the hydraulic fluid in the accumulator reaches the predetermined target pressure while the vehicle is braking but has not come to a complete stop.

7. The system of claim 6, wherein a magnitude of the adjustment of the low pressure level threshold is based on a speed of the vehicle when the pressure in the accumulator reaches the predetermined target pressure.

8. The system of claim 6, wherein the low pressure level threshold is adjusted by a fixed magnitude.

9. The system of claim 1, wherein the low pressure level threshold is adjusted based on a moving average of the hydraulic pressured reached in the accumulator over a plurality of start/stop cycles of the vehicle.

10. A method of operating a hydraulic hybrid vehicle, the method comprising:
    monitoring a hydraulic pressure in an accumulator of a hybrid hydraulic drive system of a vehicle during braking of the vehicle;
    comparing the monitored pressure to a predetermined target pressure; and
    raising a low pressure level threshold when the vehicle comes to a stop and the monitored pressure is less than the predetermined target pressure.

11. The method of claim 10, wherein a magnitude of the adjustment of the low pressure level threshold is set at a percentage of the difference between the pressure reached in the accumulator and the predetermined target pressure.

12. The system of claim 10, wherein the low pressure level threshold is adjusted by a fixed magnitude.

13. The system of claim 10, further comprising a PID controller, the PID controller determining a magnitude of the adjustment of the low pressure level threshold.

14. The system of claim 10, wherein the low pressure level threshold is lowered when the pressure of the hydraulic fluid in the accumulator reaches the predetermined target pressure while the vehicle is braking but has not come to a complete stop.

15. The system of claim 14, wherein a magnitude of the adjustment of the low pressure level threshold is based on a speed of the vehicle when the pressure in the accumulator reaches the predetermined target pressure.

16. The system of claim 14, wherein the low pressure level threshold is adjusted by a fixed magnitude.

17. The system of claim 10, wherein the low pressure level threshold is adjusted based on a moving average of the hydraulic pressured reached in the accumulator over a plurality of start/stop cycles of the vehicle.

* * * * *